US005763861A

United States Patent [19]

Herrera et al.

[11] Patent Number: 5,763,861

[45] Date of Patent: Jun. 9, 1998

[54] COUNTER STACKER FOR TORTILLA FOOD PRODUCTS

[75] Inventors: Michael Herrera, Pomona; Marciano Abarca, Maywood, both of Calif.

[73] Assignee: Casa Herrera, Inc., Pomona, Calif.

[21] Appl. No.: 594,515

[22] Filed: Jan. 31, 1996

[51] Int. Cl.[6] .............................. G01C 22/00; B61L 1/16; G06M 7/00

[52] U.S. Cl. ....................... 235/98 C; 198/431; 209/651; 414/790.7

[58] Field of Search .......................... 235/98 C; 198/431; 209/651; 414/790.7

[56] References Cited

U.S. PATENT DOCUMENTS

| | | | |
|---|---|---|---|
| 2,408,313 | 9/1946 | Hunter et al. . | |
| 3,004,702 | 10/1961 | Kranz . | |
| 3,717,751 | 2/1973 | Fluck | 214/6 D |
| 3,915,316 | 10/1975 | Pomara, Jr. | 214/6 D |
| 4,006,831 | 2/1977 | Jimenez | 214/6 D |
| 4,024,381 | 5/1977 | Fluck | 235/92 PK |
| 4,484,066 | 11/1984 | DeBlieux et al. | 235/98 |
| 4,530,632 | 7/1985 | Sela | 414/35 |
| 4,754,699 | 7/1988 | Cope et al. | 99/404 |
| 5,072,099 | 12/1991 | Szabo | 235/98 |
| 5,253,762 | 10/1993 | Duncan | 209/552 |
| 5,298,274 | 3/1994 | Khalsa . | |
| 5,601,397 | 2/1997 | Lopez et al. | 414/90.7 |

OTHER PUBLICATIONS

"Corn Tortilla and Flour Tortilla Production Equipment", Casa Herrera, Inc., Donald B. Clark, P.E., Manhattan, Kansas, Aug. 31–Sep. 2, 1987.

Flour Tortilla Counter Stackers, Casa Herrera Model FTCS 234, Casa Herrera, Inc.

4–Lane Corn Tortilla Electronic Counter Stacker, Casa Herrera Model ECS 4, Casa Herrera, Inc.

Dual Line Electronic Counter Stacker W/Carry–Off Conveyor, Casa Herrera, Inc.

*Primary Examiner*—Michael L. Gellner
*Assistant Examiner*—Daniel Chapik
*Attorney, Agent, or Firm*—Joseph C. Andras

[57] ABSTRACT

Problems in counting and stacking fried food products such as tostadas are solved by an improved counter/stacker device in which tortilla food products ride a first moving belt through a photoelectric counting station. After being counted the product drops into a stack retainer shaped to hold the product. A series of stack retainers are arranged along the length of a flexible, intermittently moving, continuous belt. When the counting station signals that the required number of product have been counted and deposited into a stack, the flexible belt bearing the stack retainer is rapidly advanced to bring an empty stack retainer into position beneath the counting station. The stack retainers ensure that the product stacks do not shift and are stationary for a period of time, thereby facilitating manual or automatic packaging of the product.

9 Claims, 8 Drawing Sheets

COUNTER STACKER FOR TORTILLA FOOD PRODUCTS

BACKGROUND OF THE INVENTION

1. Field of the Invention

The present invention is in the field of devices for food preparation and, more specifically, an automated device for counting and forming stacks of tostada shells and other tortilla food products prior to packaging.

2. Description of Related Art

The United States has been called a truly a multiethnic, multicultural society. One has only to look at the vast variety of ethnic restaurants and the specialty food items currently in common vogue to appreciate the truth of this statement, for cuisine tends to be one of the most pervasive indicator of a culture. Frequently, the most characteristic aspects of a cuisine are dictated by the native cereal grain of the area where the cuisine originated. That is, rice is native to Asia and became the common grain of Asian civilizations. Therefore, rice and foodstuffs made from rice are a common characteristic of Asian cuisines.

The cuisines of the New World are even more strongly influenced by the indigenous cereal grain corn (maize). Although corn can be eaten fresh (corn on the cob), the largest consumption is from dried kernels, since they can be readily stored without refrigeration. The native cultures of the Americas developed a number of ways to process and consume dried corn. Because corn does not contain gluten proteins, it cannot be used to produce a leaven bread. Instead, it is commonly processed into a dough (masa) which is then formed into tortillas.

Tortillas and related food products such as corn chips and tostadas have become a popular part of the ordinary diet in the United States. However, the preparation of these items from dried corn is beyond the ken of most home cooks. Therefore, to satisfy the growing demand for these products, a whole host of specialized commercial food preparation devices have been developed. Special units called sheeting heads or sheeters are used to form the sticky masa dough into a thin sheet from which tortillas and chips are cut. Continuous-feed ovens and fryers have been developed to bake the raw tortillas and fry the tostadas and chips. Finally, the completed tortilla food products are packaged and transported to stores.

Even packaging presents a challenge. Ordinary tortillas are flat and fairly flexible and are typically sold stacked in packages of one or two dozen tortillas. Tostadas, being fried tortillas, are also flat, but are rigid and brittle. FIGS. 1 and 2 show a prior art counter/stacker unit 10 that was developed to produce counted stacks of tortillas for packaging purposes. The unit comprises a number of counting stations 12 arranged over a first moving conveyor belt 14. The conveyor belt 14 is actually comprised of a number of separate flexible strands, each of which forms a continuous belt.

A tortilla 11 is deposited near a first end 16 of the first belt 14 and passes under the counting station 12, where the tortilla 11 interrupts a light beam and is counted by a photoelectric sensor. After being counted, the tortilla drops from a second end 18 of the belt 14 and lands near a first end 16' of a second moving conveyor belt 14'. A series of movable finger members 17 are disposed between strands of the second belt 14' and prevent the tortillas 11 from moving down the belt 14'. The strands of the belt 14' present only a limited area of contact with the tortilla 11 so that the strands are able to slide under the tortilla 11, which remains impounded by the finger members 17.

As each successive tortilla drops off of the first belt 14, it lands on top of the prior tortilla, forming a stack 19 behind the finger members 17. When the counter station 12 determines that the desired number of tortillas 11 in the stack 19 is correct, the finger members 17 are retracted and the stack 19 is moved by the second conveyor belt 14' to the second end 18'. Because the tortillas 11 are relatively soft and flexible, the stack 19 remains intact during transit to the second end 18' of the belt 14', where the stack 19 is placed into a plastic shipping bag or other appropriate container. Because the second belt 14' moves continuously, some skill is required to grab each moving stack.

As might be anticipated, the counter/stacker unit 10 is also employed with tostadas. Because tostadas are prepared by frying tortillas, they have almost exactly the same dimensions as tortillas. However, tostadas are rather light and rigid because the frying process drives off water returning the tortillas to almost a "dry corn" state. Consequently, tostadas in a stack do not conform to each other as do tortillas and are much more liable to slip past one another.

When the finger members 17 are retracted and the stacked tostadas begin to move, the stack often shifts as the tostadas slip past each other: the bottom tostada, in contact with the belt 14', begins to move at the same speed as the belt 14'; however, slippage occurs at each tostada-tostada interface causing the top of the stack 19 to lag behind the bottom tostada. In the worst cases the stacks actually fall over, requiring a worker to reassemble the stack before packaging. If the stack does not actually fall over, shifting still wastes time, as a worker must straighten the stack before the packaging process.

While the shifting stack problem can be reduced by slowing the speed of the second moving belt 14', such slowing the belt negatively impacts throughput of the entire production facility.

OBJECTS AND SUMMARY OF THE INVENTION

It is an object of the present invention to provide an improved stacker/counter machine that is adapted to hard tortillas food products such as tostadas;

It is a further object of the present invention to provide an improved counter/stacker that maintains integrity of product stacks even during high speed operation; and It is another object of the present invention to facilitate packaging by providing a stationary stack of food product.

These and other objects are realized in an improved counter/stacker device in which tortilla food products ride a first moving belt through a photoelectric counting station. After being counted, the product drops into a stack retainer shaped to hold the product. A series of stack retainers are arranged along the length of a flexible, continuous belt. When the counting station signals that the required number of product have been counted, the flexible belt bearing the stack retainer is rapidly advanced to bring an empty stack retainer into position beneath the counting station. The stack retainers ensure that the product stacks do not shift and are stationary for a period of time, thereby facilitating manual or automatic packaging of the product.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved counter/stacker device for tortilla food products that is able to count and stack at a high rate of speed and maintain the integrity of tostadas as well as tortilla stacks.

Figure 1:
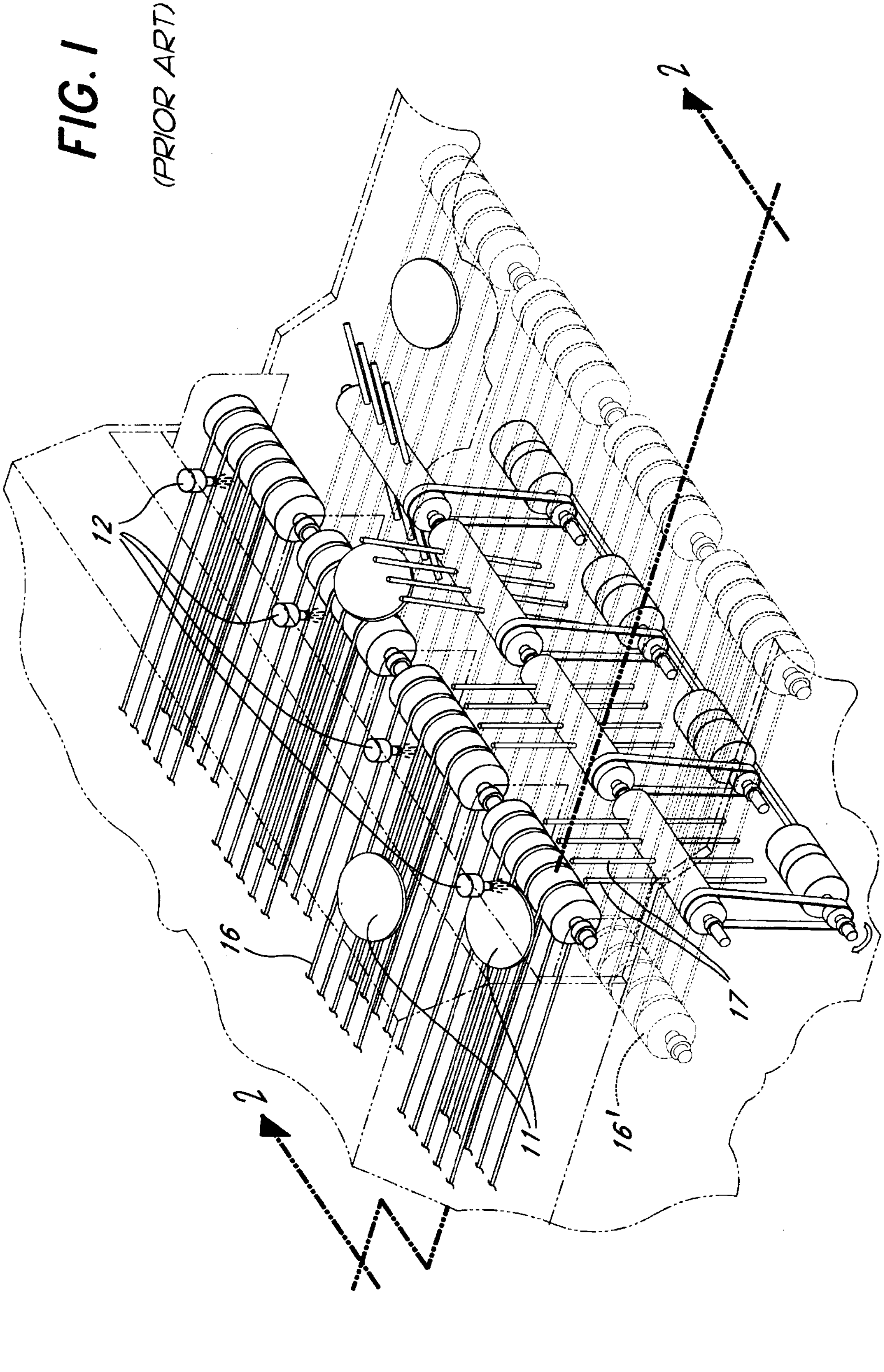
FIG. 1 (PRIOR ART)
FIG. 1 shows a perspective view of a prior art counter/stacker.
Figure 2:
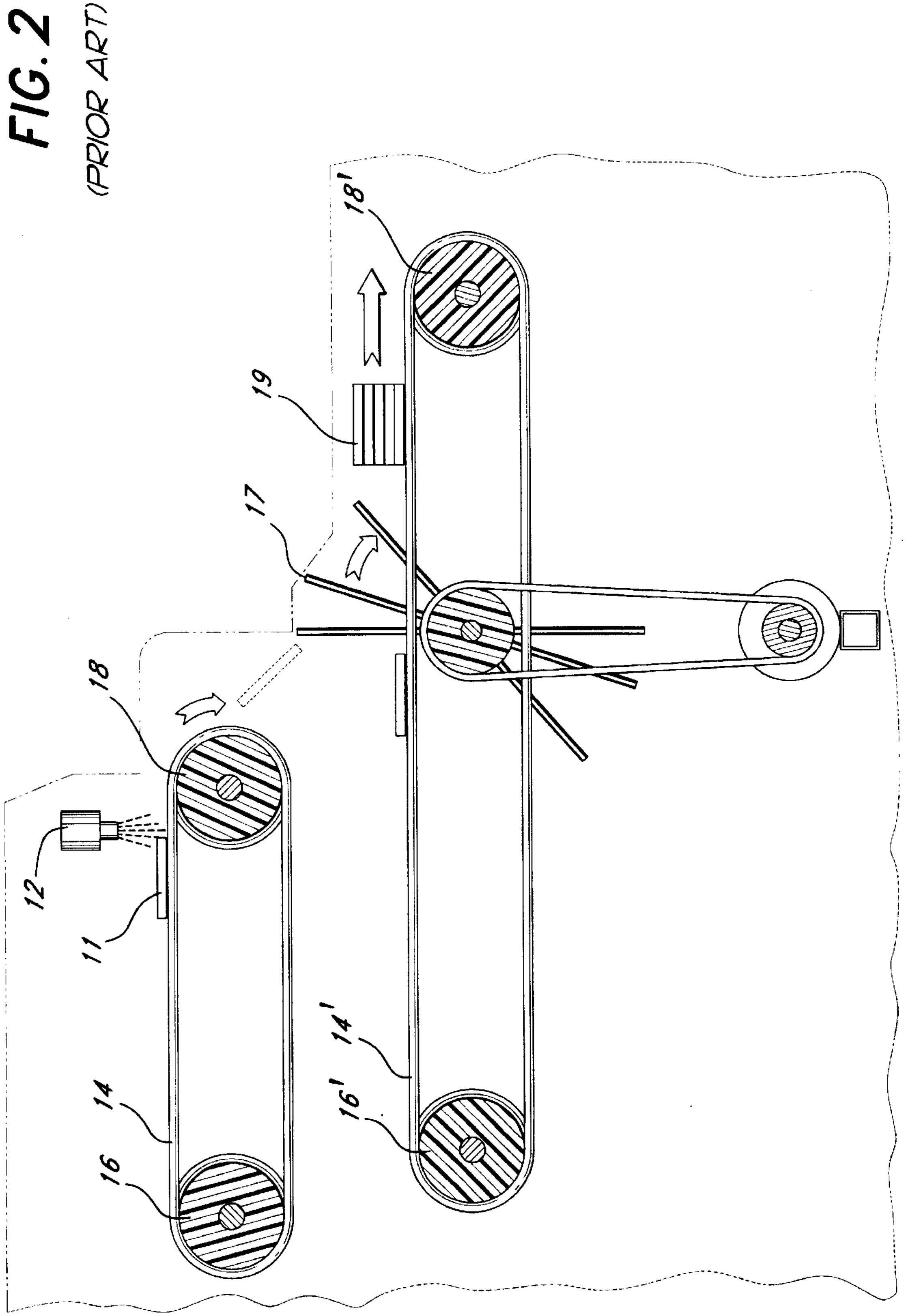
FIG. 2 (PRIOR ART)
FIG. 2 shows a diagrammatic cross-section through the prior art counter stacker of FIG. 1.
Figure 3:
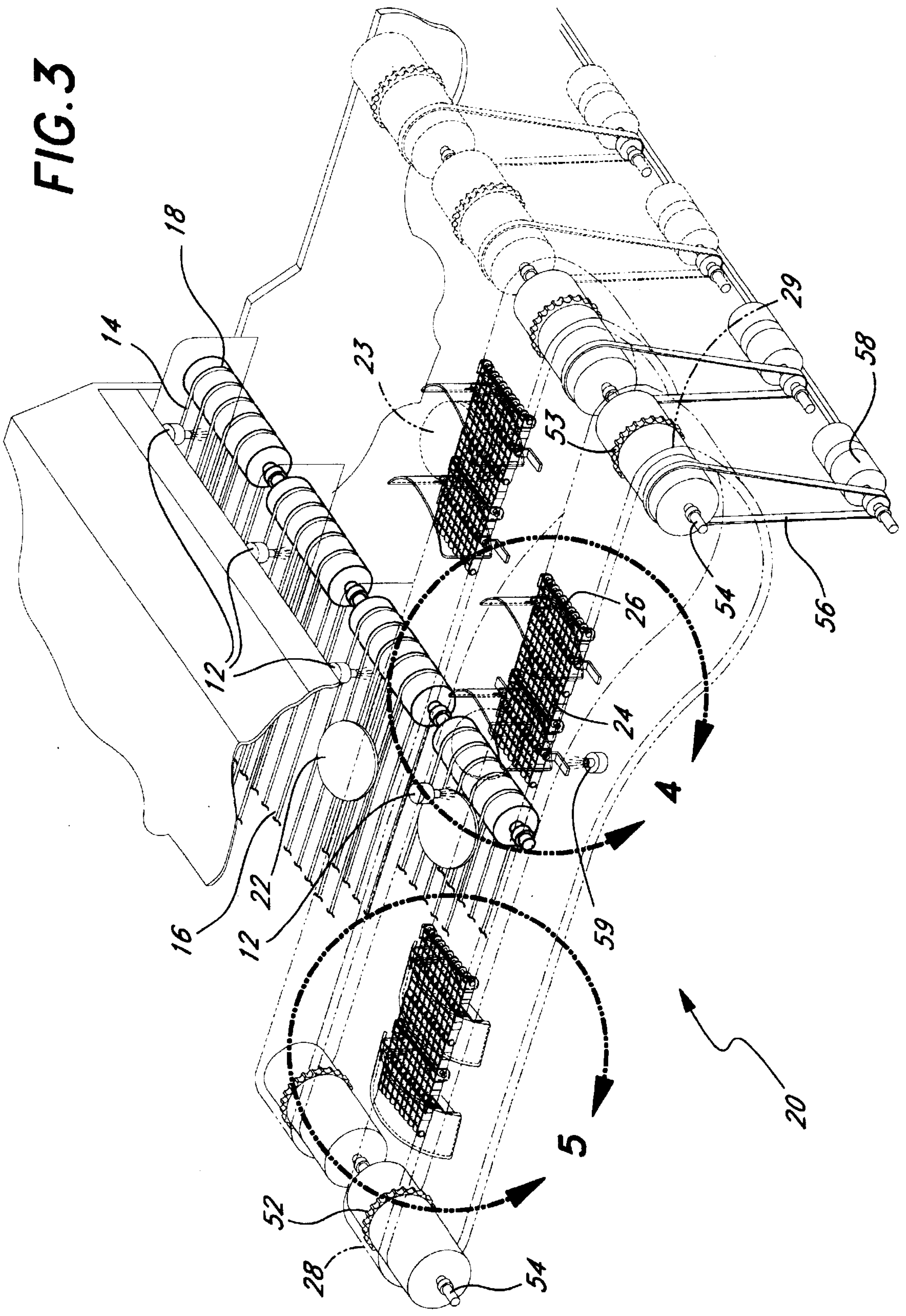
FIG. 3 shows a perspective view of a counter stacker of the present invention.

FIG. 3 shows an improved counter stacker 20 of the present invention. The unit comprises two moving belts. A tostada 22 is deposited towards a first end 16 of the first belt 14. As in the prior art device (FIG. 1), the first belt 14 can be constructed from a number of flexible strands, each of which is a continuous loop. The tostada 22 is transported by the belt 14 through the counting station 12, where it is counted photoelectrically. The counter stacker 20 actually comprises a number of parallel channels, each of which acts independently to count and stack the tostadas 22. While the number of channels can easily be varied, the illustrated unit has four counting channels.

After the tostada 22 is counted, it moves to a second end 18 of the first belt 14 and drops into a stack retainer 24 attached to a stack retainer endless belt 26. Unlike the first belt 14 the stack retainer belt 26 does not move continuously. Instead, the stack retainer belt 26 is designed so that it comes to a full stop with one of the stack retainers 24 correctly positioned at a collecting position, beneath the second end 18 of the first belt 14, so it catches the tostadas 22 falling off the second end 18 of the first belt 14.

Figure 4:
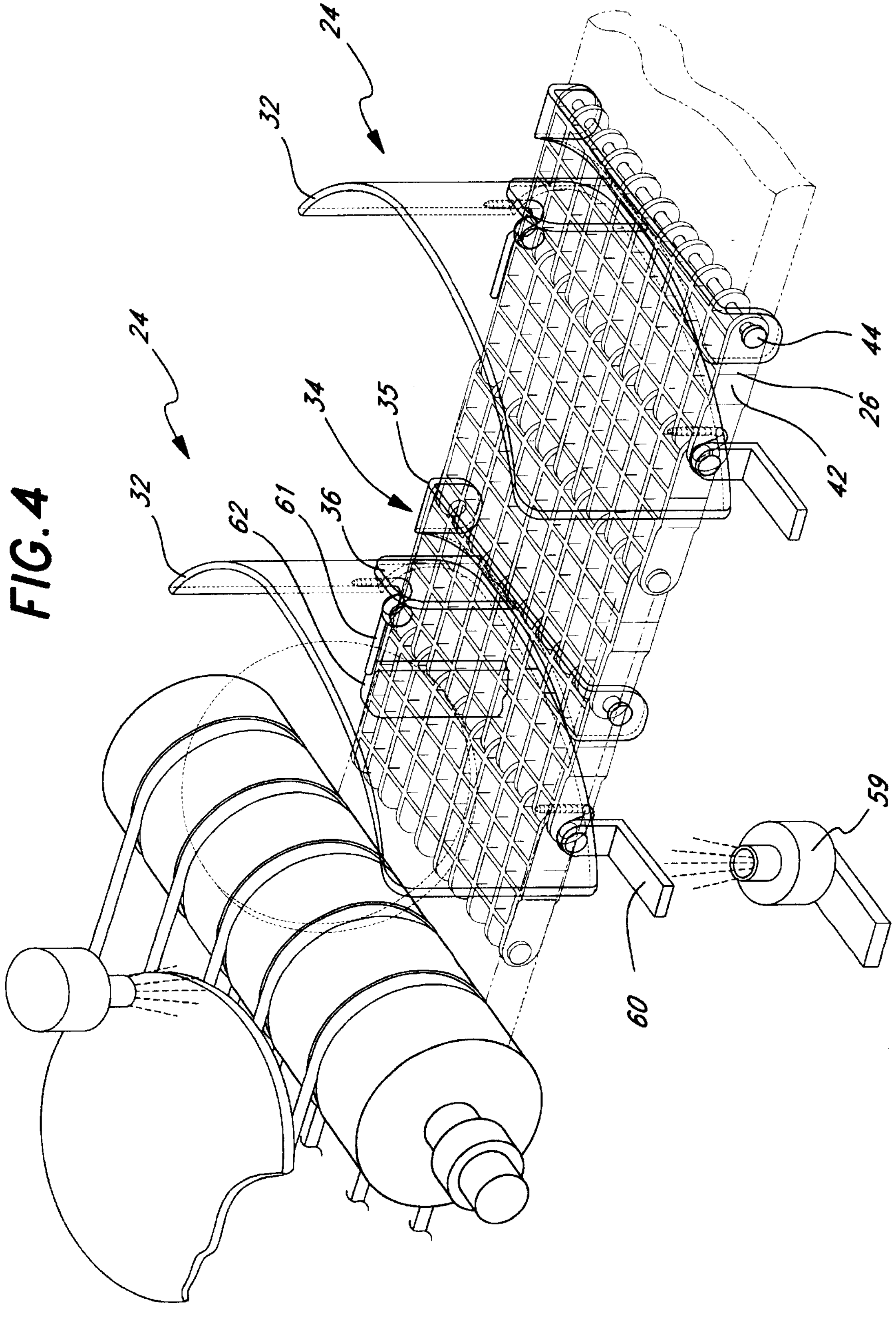
FIG. 4 shows a close-up view of extended stack retainers on a stack retainer belt use in the counter stacker of FIG. 3.

When the counting station 12 indicates that the desired number of tostadas have been dropped onto the stack 23, the stack retaining belt 26 is rapidly advanced the length of one stack retainer 24 (about six inches) to bring an empty stack retainer 24 into position to receive the next counted stack 23 of tostadas. As shown in FIG. 4, the stack retainers 24 of the current invention each comprise two parts hingedly attached to the flexible stack retainer belt 26. Semicircular stack retaining members 32 are spaced apart on the stack retainer belt 26 a sufficient distance to contain the tostada stack 23. Thus, the shape and spacing of the stack retaining members 32 is controlled by the size and shape of the tostadas 22 or other food product that is to be stacked.

Each stack retaining member 32 is contacted on its convex surface by a stack supporter 34 which comprises a base 35 hingedly attached to the belt 26 and a member 36 which is attached to the base 35 and contacts the stack retaining member 32. The stack supporter 34 is designed to prevent the edge of a tostada from becoming stuck under the retaining member 32. Thus, the tostada stack 23 is defined by the retaining member 32 of one stack retainer 24 and the stack supporter 34 of the immediately previous (closer to the first belt 14) stack retainer 24. The individual stack retaining members 32 and stack supporters 34 are made of clear plastic such as polycarbonate so that the tostada stack 23 remains readily visible at all times. Any other suitable plastic or transparent material can easily be employed to construct the stack retainers 24.

Figure 5:
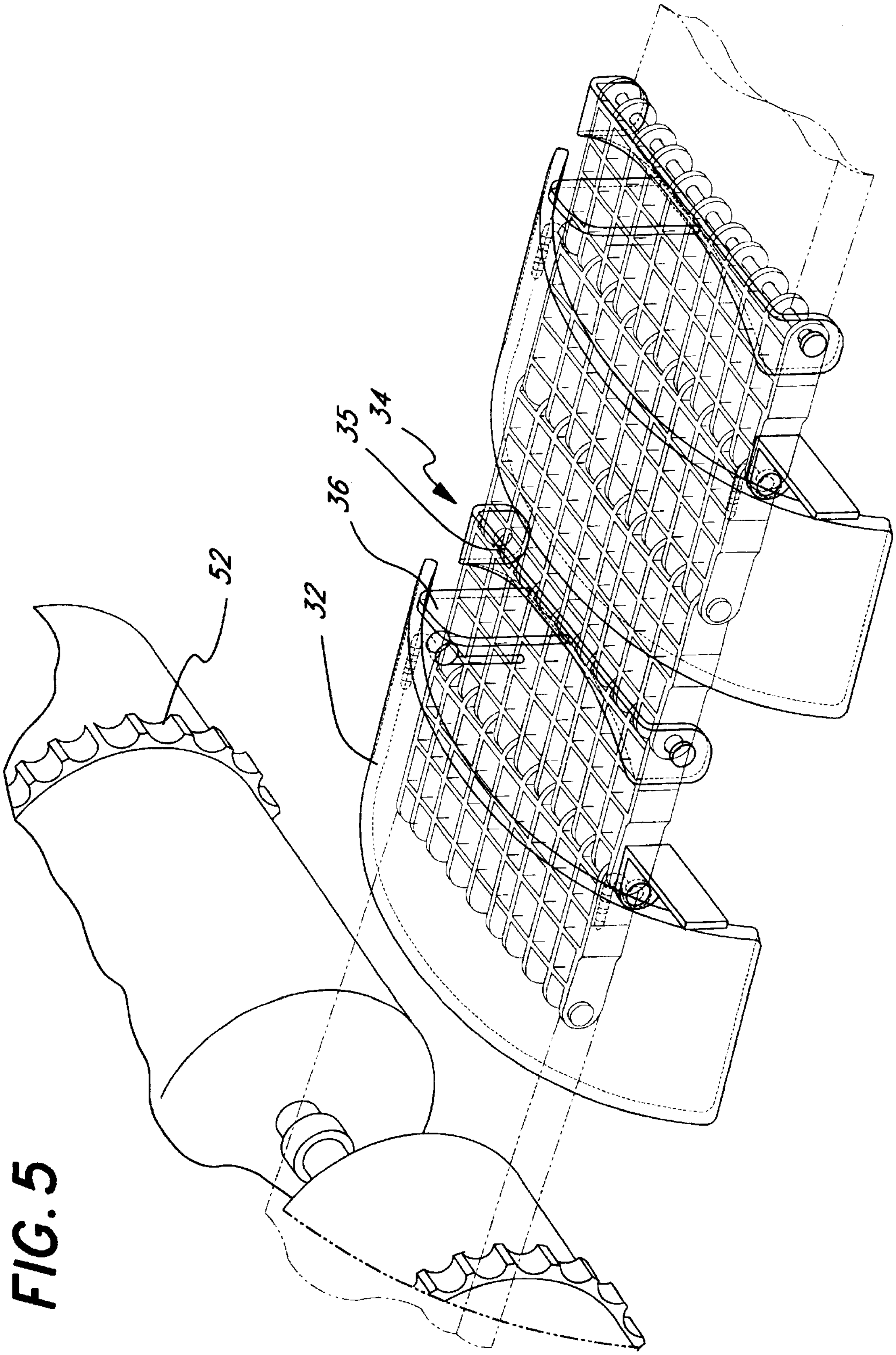
FIG. 5 shows a close-up view of collapsed stack retainers used counter/stacker of the present invention.
Figure 6:
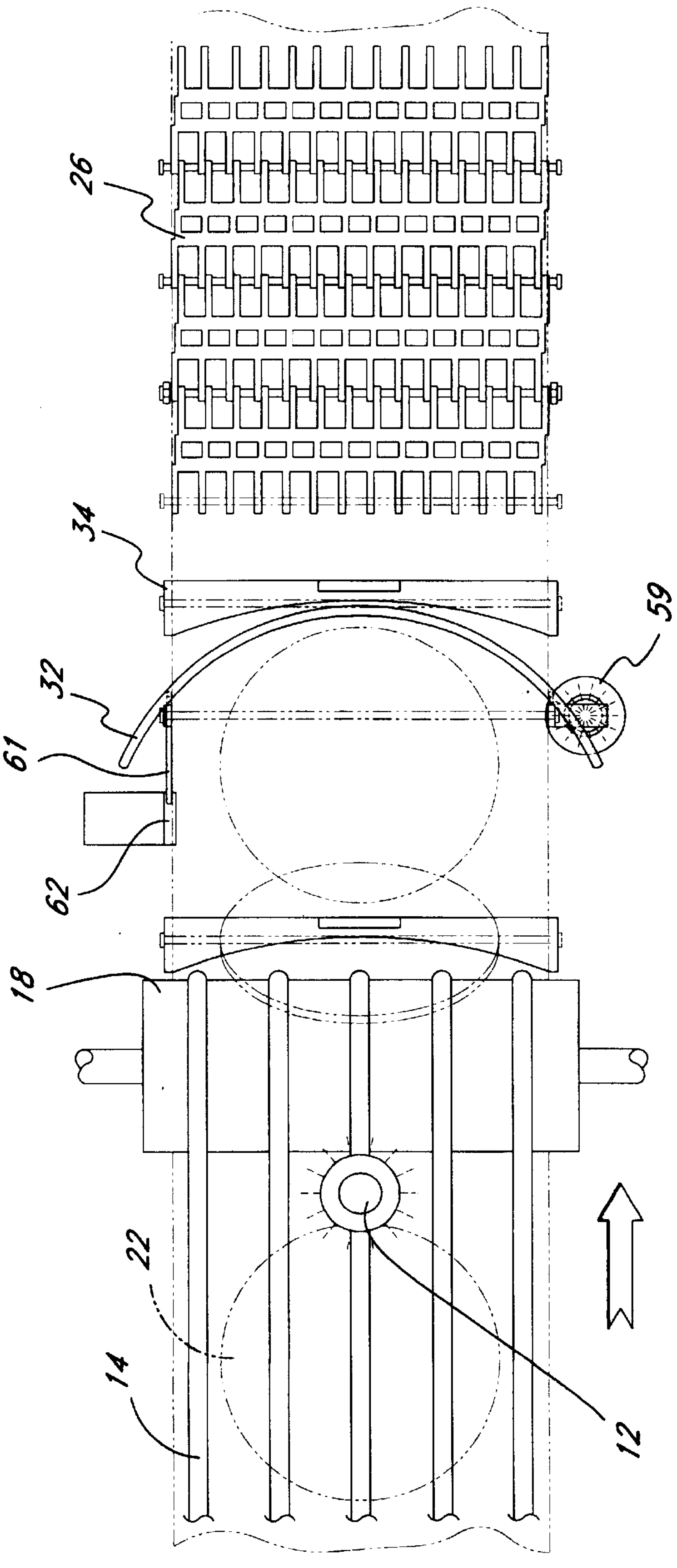
FIG. 6 shows a view of the extended stack retainer from above receiving tostadas.
Figure 7A:
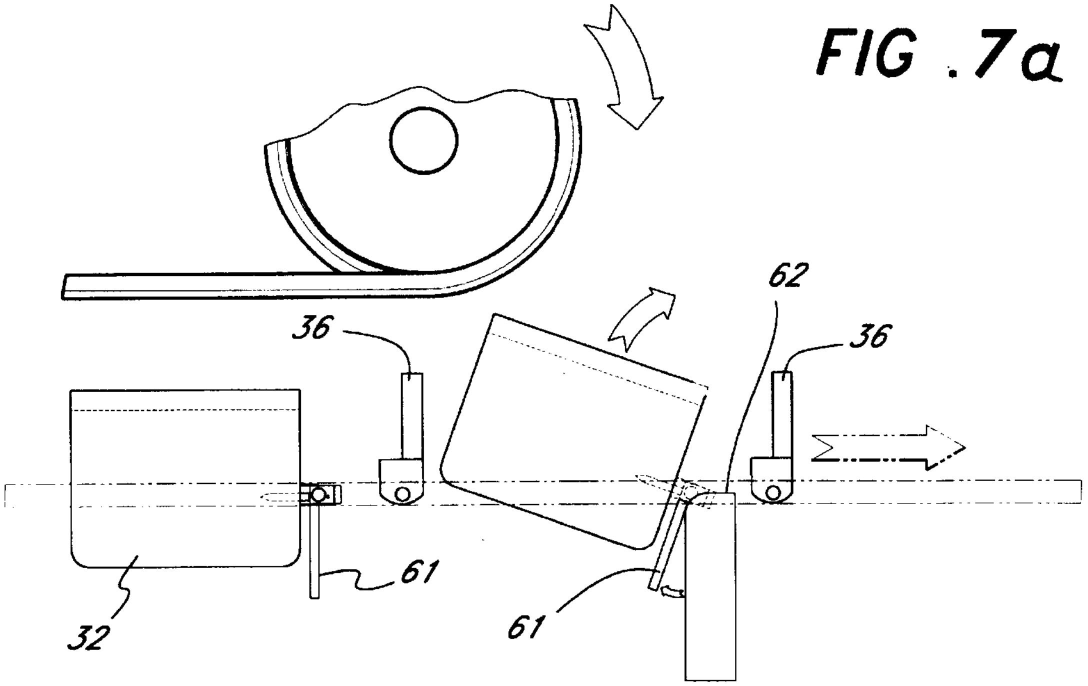
FIG. 7*a* and 7*b* show the transition from collapsed to extended stack retainer from the side.
Figure 7B:
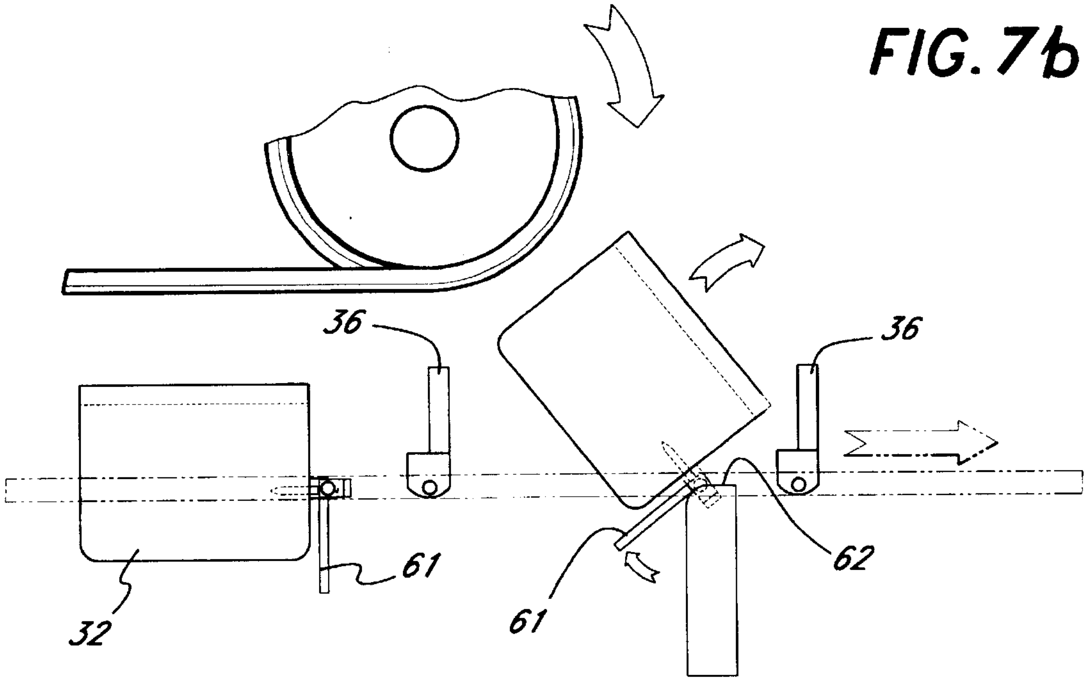
Figure 8:
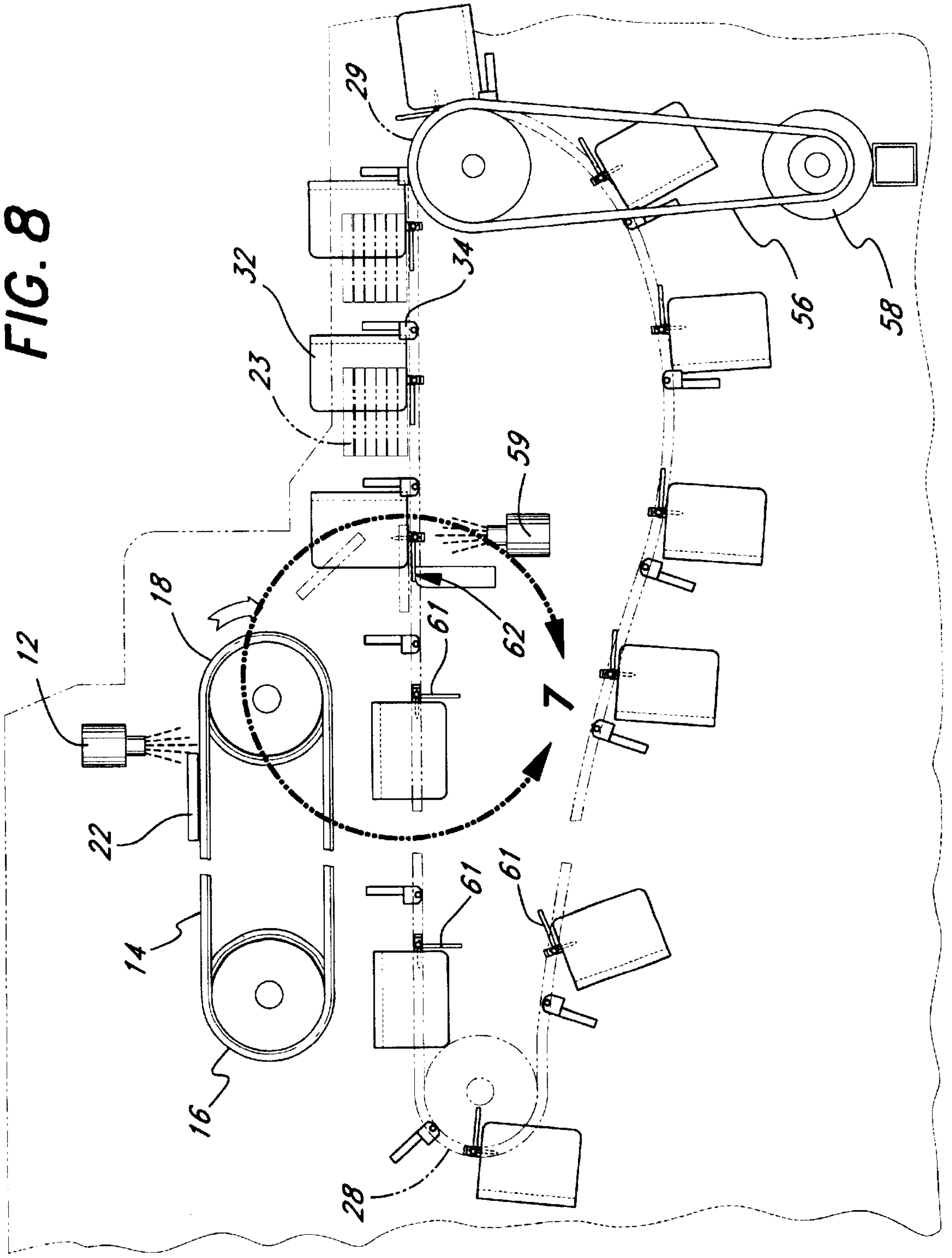
FIG. 8 shows a cross-sectional diagrammatic view of the entire tostada counter-stacker of the present invention.

The hinged attachment of the stack retainer 24 components to the belt 26 allows the stack retaining member 32 to be folded down into a collapsed position as shown in FIG. 5. As illustrated in FIG. 7, this collapsed configuration allows the stack retainer 24 to pass below the first belt 14. If the clearance between the first belt 14 and the stack retaining belt 26 had to be large enough to accommodate the extended configuration of the stack retainers 24, the distance that the tostada 22 must drop from the first belt 14 to the stack retaining belt 26 would be too great and the tostada 22 might be damaged. As shown in FIGS. 6, 7*a*, and 7*b*, each stack retaining member 32 bears a tip lever 61, as well as the positioning tab 60. The tip lever 61 collides with a stationary positioner 62, which flips the retaining member 32 into the extended configuration before it reaches the collecting position.

The stack retainer belt 26 itself is constructed from a series of plastic links 42 fastened together by axle pins 44 not unlike the structure of a bicycle chain. Again, the links 42 are made from an approved food grade plastic, although stainless steel or some other food grade material could be used as well. An advantage of this belt structure is that the belt is modular: additional links 42 can readily be added to create a belt of virtually any length. Furthermore, the links 42 can be removed and replaced if they become damaged or worn. The components of each stack retainer 24 are attached to the belt 26 by means of the pins 44 so that the stack retainers 24 and be easily removed or repositioned. Also, the link-pin belt design allows special links 42 to be manufactured which include the stack supporter 34 as an integral part of the link 42. Such an integral link-supporter would be easier to clean and less expensive to produce.

The stack retainer belt 26 is suspended by a series of sprockets. The currently employed belt is suspended by a sprocket 52 located at the first end 28 of the belt 26 and a second sprocket 53 located at the second end 29. The sprockets 52, 53 are mounted on bearing-suspended axle shafts 54. The use of a belt design that allows a sprocket-type drive is important for ensuring exact positioning of the stack retainers 24. Although some sort of friction drive could be employed, that would make it more difficult to guarantee the positioning of the stack retainers 24.

Each stack retainer belt 26 is driven by a chain 56 that links a stepper motor 58 to the axle 54. Each stack retainer belt 26 in the unit 20 is separately driven so that each counting station 12 can operate at a different rate. Thus, the present unit 20 which has four stack retaining belts 26 also has four stepper motors 58. The use of stepper motors 58 simplifies precise positioning of the stack retainers 24. The length of each stack retainer 24 can be represented as a precise number of motor steps. Once one of the stack retainers 24 is correctly positioned at the collecting position, the belt can be precisely advanced to bring the next stack retainer into the collecting position by simply causing the stepper motor to execute a number of steps equal to the length of the stack retainer 24.

Positioning of the stack retainer 24 at the collecting position can occur at a start-up "reset" of the unit 20. A position sensor 59 at the collecting position detects when the stack retainer 24 is in the correct position by means of the positioning tab 60 located on each stack retaining member 32. This detection can be made optically with a photosensor, mechanically with a microswitch or magnetically with a Hall effect sensor or the like. Once the system has detected the correct position of the stack retainer 24, subsequent belt movements can be made by number of steps as explained above. Alternatively, it is possible to use the position sensor 59 to stop the belt as each stack retainer 26 comes into the correct position.

FIG. 6 shows the unit 20 in operation from above. The first belt 14 is moving a series of tostadas 22 from left to right past the counting station 12 so that they fall off the end 18 of the first belt 14 and land on the stack retainer belt 26 collecting behind the stack retaining member 32 which is stationary in the stack collecting position. After the counting station 12 has determined that the proper number of tostadas to comprise a complete stack 23 has been deposited into the stack retainer 24, the retaining belt 26 advances left to right to bring an empty stack retainer 24 into the collecting position. The stack retaining members 32 on one side of the collecting position and the stack supporter 34 on the other side ensure that the tostada stack 23 does not shift as the belt 26 advances.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A counter stacker apparatus for use in the production of food products, the apparatus comprising:

counting means for counting each unit of food product as the unit is transported within operational distance of the counting means;

first conveyor means for transporting each unit of food product within operational distance of the counting means;

a plurality of stack retaining means for holding and stacking the units of food product after said units are counted by the counting means when a stack retaining means is disposed in effective relationship with an end of the first conveyor means;

second conveyor means for supporting the plurality of stack retaining means in a spaced relationship thereabout; and motor means for intermittently moving the second conveyor means to bring successive ones of the plurality of stack retaining means sequentially into effective relationship with the end of the first conveyor means.

2. A counter stacker apparatus for use in the production of tortilla products, the apparatus comprising:

counting means for counting each unit of food product as the unit is transported within an operational distance of the counting means;

first conveyor means, having a first end for receiving the units of food product and a second end for dispatching the units of food product, for transporting each unit of food product from the first end to the second end within an operational distance of the counting means;

a plurality of stack retainers sized for holding and stacking the units of food product dispatched from the second end of the first conveyor means when a stack retainer is disposed in an effective relationship below the second end of the first conveyor means;

second conveyor means for holding the plurality of stack retainers in a spaced relationship thereabout; and motor means for intermittently moving the second conveyor means to bring successive ones of the plurality of stack retainers sequentially into effective relationship with second end of the first conveyor means.

3. A counter stacker apparatus for use in the production of tortilla food products, the apparatus comprising;

a counting station for counting each unit of food product as the unit is moved within an operational distance and for defining a number of units of food product that constitutes a full stack;

a first conveyor belt having a first end for receiving the units of food product and a second end, the first conveyor belt moving each unit of food product from the first end to the second end to allow counting by the counting station;

a plurality of stack retainers, each stack retainer sequentially positionable below the second end of the first conveyor belt, each stack retainer sized for catching and stacking the units of food product dropping from the second end of the first conveyor belt into a stack when the stack retainer is in a correct position below the second end of the first conveyor belt;

a second conveyor belt to which the stack retainers are attached and spaced along; and a motor operationally connected to the second conveyor belt for intermittently moving the second conveyor belt to bring each stack retainer sequentially into the correct position below the second end of the first conveyor belt so that after each stack retainer catches one full stack of units.

4. The apparatus of claim 3, wherein the second conveyor belt is comprised of rigid links hingedly connected by axle pins.

5. The apparatus of claim 3, wherein the stack retainer comprises a semicircular stack retainer that defines a first end of the stack and a stack supporter that defines a second end of the stack.

6. The apparatus of claim 5, wherein components of the stack retainer are hingedly connected to the second conveyor belt allowing the stack retainer to be collapsed to pass beneath the first conveyor belt.

7. The apparatus of claim 3, wherein the second conveyor belt also comprises sensor means for detecting when each stack retainer is in the correct position beneath the second end of the first conveyor belt, and wherein the sensor means is interfaced with the motor for intermittently controlling the motor to ensure that the stack retainer is in the correct position.

8. The apparatus of claim 3, wherein the motor is a stepper motor.

9. The apparatus of claim 3, wherein the plurality of stack retainers are hingedly connected to the second conveyor belt allowing the stack retainer to collapse from an upright position and pass beneath the first conveyor belt.

* * * * *